(12) United States Patent
Grossman et al.

(10) Patent No.: US 10,515,143 B2
(45) Date of Patent: *Dec. 24, 2019

(54) WEB-BASED SYSTEM FOR CAPTURING AND SHARING INSTRUCTIONAL MATERIAL FOR A SOFTWARE APPLICATION

(71) Applicant: Autodesk, Inc., San Rafael, CA (US)

(72) Inventors: Tovi Grossman, Toronto (CA); George Fitzmaurice, Toronto (CA); Justin Frank Matejka, Newmarket (CA); Thomas White, Burlington (CA); Ara Danielyan, Toronto (CA); Ruslana Steininger, Toronto (CA); Michael Chen, Toronto (CA); Anderson Nogueira, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 13/706,224

(22) Filed: Dec. 5, 2012

(65) Prior Publication Data

US 2013/0174028 A1    Jul. 4, 2013

Related U.S. Application Data

(62) Division of application No. 13/686,733, filed on Nov. 27, 2012.

(60) Provisional application No. 61/720,369, filed on Oct. 30, 2012, provisional application No. 61/564,171, filed on Nov. 28, 2011.

(51) Int. Cl.
*G06F 17/00* (2019.01)
*G06F 17/24* (2006.01)
*G06F 16/50* (2019.01)
*G06Q 10/06* (2012.01)

(52) U.S. Cl.
CPC .............. *G06F 17/24* (2013.01); *G06F 16/50* (2019.01); *G06Q 10/06* (2013.01)

(58) Field of Classification Search
CPC .. G06F 17/30056; G06F 17/24; G06F 17/241; G06F 17/30846
See application file for complete search history.

(56) References Cited

U.S. PATENT DOCUMENTS 7,580,568 B1    8/2009  Wang et al.
2004/0222995 A1*  11/2004  Colle ........................... 345/545
(Continued)

OTHER PUBLICATIONS

"The Diver Project: Interactive Digital Video Repurposing," Pea et al., IEEE, 2004, pp. 54-61 ("Pea").*
(Continued)

*Primary Examiner* — Andrew T McIntosh
(74) *Attorney, Agent, or Firm* — Artegis Law Group, LLP

(57) ABSTRACT

A system and technique for capturing a workflow history and video of an electronic document are disclosed. Events generated by an application while modifying an electronic document are stored on a web server as metadata. In addition, a captured digital image or frames of captured digital video that reflect the state of the document at the time the event was generated are also stored on the web server. The metadata is associated with one or more portions of the document and with the captured digital image or frames of captured digital video.

25 Claims, 13 Drawing Sheets

(56) References Cited

U.S. PATENT DOCUMENTS

| | | | | |
|---|---|---|---|---|
| 2007/0233738 A1* | 10/2007 | Weinberger et al. | ...... | 707/104.1 |
| 2008/0016245 A1* | 1/2008 | Cunningham | ...... | G06F 3/04817 |
| | | | | 709/246 |
| 2008/0019662 A1* | 1/2008 | Scherlis | ............... | G11B 27/034 |
| | | | | 386/278 |
| 2011/0221898 A1* | 9/2011 | Leis | ........................ | G09B 5/02 |
| | | | | 348/143 |
| 2013/0083210 A1* | 4/2013 | Beckham | ........... | H04N 21/2743 |
| | | | | 348/207.11 |
| 2014/0304215 A1* | 10/2014 | Masinter | ............. | G06F 17/3023 |
| | | | | 707/602 |

OTHER PUBLICATIONS

Non-Final Office Action, U.S. Appl. No. 13/686,733 dated Jun. 17, 2015.

* cited by examiner

WEB-BASED SYSTEM FOR CAPTURING AND SHARING INSTRUCTIONAL MATERIAL FOR A SOFTWARE APPLICATION

CROSS-REFERENCE TO RELATED APPLICATIONS

This application is a Divisional to United States Patent Application titled, "Web-Based System for Capturing and Sharing Instructional Material for a Software Application", filed on Nov. 27, 2012, Ser. No. 13/686,733, which claims priority to United States Provisional Patent Application titled, "A Web-Based Architecture for Capturing and Sharing application Workflows", filed on Nov. 28, 2011, Ser. No. 61/564,171 and United States Provisional Patent Application titled, "A Web-Based Architecture for Capturing and Sharing Application Workflows", filed on Oct. 30, 2012, Ser. No. 61/720,369, which both are hereby incorporated by reference.

BACKGROUND OF THE INVENTION

Field of the Invention

The invention relates generally to computer software and, more specifically, to a web-based system for capturing and sharing instructional material for a software application.

Description of the Related Art

A wide variety of software applications are currently available to end-users, including computer-aided design (CAD) applications, computer graphics applications, animation applications, word processing applications, and computer programming applications, among others. Despite advances in making complex applications easier to operate, learning how to use such applications can still be problematic. More complex applications, such as CAD and computer graphics applications, often have thousands of commands or functions to choose from, and many more ways for an end-user to combine the different functions into workflows to complete a particular task. When using an unfamiliar area of such an application, even expert end-users may require assistance.

Consequently, learning resources, such as workflow videos, have been developed that provide end-users of software applications with instructional information. A workflow video typically includes a video of screen captures taken while an experienced end-user of a software application, also referred to as a "skilled user," performs a series of operations in the software application. Workflow videos may also be annotated and/or have voice-over narration as further instruction. In addition to rendering assistance in using the different tools associated with a software application, workflow videos visually demonstrate a sequence of operations or actions performed by an experienced end-user of the software application to modify an electronic document in a specified way. For example, for a CAD application, workflow videos may be developed for topics such as "drawing a floor plan," "basic dimensioning," "cross-hatching," etc. Due to the visual presentation of the operations or commands used by the creator of a workflow video and the modifications that result in the electronic document, workflow videos can be a powerful instructional resource for less-experienced end-users of the software application.

However, access to workflow videos produced by individual end-users can be problematic. First, the storage capacity required for video screen captures is generally too large to expect such users to store workflow videos locally, such as on a laptop or home computer. Furthermore, locally stored workflow videos generally cannot be accessed by other end-users. Because of these issues, the utility of instructional workflow videos for end-users is somewhat limited.

As the foregoing illustrates, there is a need in the art for a more effective way to provide end-users of a software application with instructional information related to using that software application.

SUMMARY OF THE INVENTION

One example embodiment of the present invention sets forth systems and methods for capturing a workflow history and video of an electronic document and for efficiently locating and viewing the captured workflow video. Events generated by an application while modifying an electronic document are stored on a web server as metadata that is associated with one or more portions of the document as well as with captured digital video that reflects the state of the document at the time the event was generated.

Because the metadata and captured digital video are associated with each other and are stored together on a web server, one advantage of the disclosed approach is that the captured digital videos are easily accessed by end-users. In addition, the disclosed systems and methods advantageously provide a flexible and intuitive approach for navigating and displaying workflow videos.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
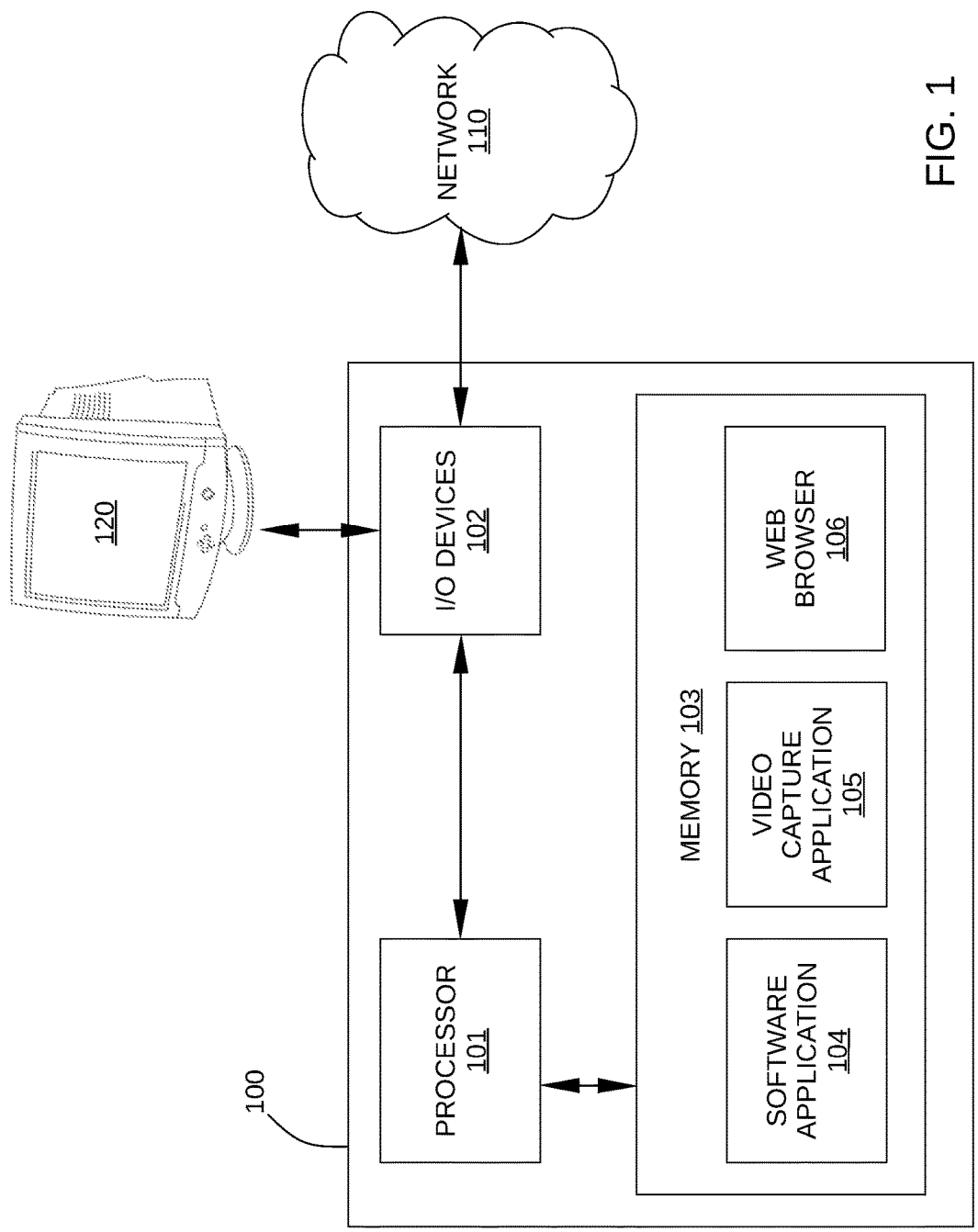
FIG. 1 is a block diagram of a system configured to implement one or more aspects of the present invention.

FIG. 1 is a block diagram of a computing system 100 configured to implement one or more embodiments of the present invention. Computing system 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing system 100 includes, without limitation, a processor 101, input/output (I/O) devices 102, and a memory 103, and is configured to run a software application 104, a video capture application 105, and a web-browser 106 that reside in memory 103. Computing system 100 is configured to receive input from an end user via I/O devices 102, and is further configured to display graphical images and/or video to the end user via I/O devices 102. It is noted that the computing device described herein is illustrative and that any other technically feasible configurations of computing devices fall within the scope of the present invention.

Processor 101 may be any suitable processor implemented as a central processing unit (CPU), a graphics processing unit (GPU), an application-specific integrated circuit (ASIC), a field programmable gate array (FPGA), and/or another type of processing unit. Processor 101 is configured to execute program instructions associated with a particular instruction set architecture (ISA) specific to processor 101, including software application 104 and video capture application 105. Processor 101 is also configured to receive data from and transmit data to I/O devices 102 and memory 103. For example, processor 101 may periodically deliver pixel data to a display device 120 with an analog or digital signal.

I/O devices 102 include devices that may be used to input data to computing system 100 or devices that output data from computing system 100. I/O devices 102 may include input devices, such as a joystick, a switch, a microphone, a video camera, a keyboard, a mouse, a touchpad, an interactive pen display, and/or a pen tablet, among others. I/O devices 102 may also include one or more output devices, such as a display screen, a speaker, a projector, or a lamp, among others. In addition, I/O devices 102 may include devices used to input data to or output data from computing system 100, such as an Ethernet port, a serial port, a compact disc (CD) drive, or a digital video disc (DVD) drive, among others. In some embodiments, one or more of I/O devices 102 are configured to couple computing system 100 to a network 110.

I/O devices 102 also include display device 120. Display device 120 may be a computer monitor, a video display screen, a display apparatus incorporated into a hand held device, any conventional CRT or LED monitor, or any other technically feasible display screen configured to present video media to an end user. In some embodiments, display device 120 is a terminal window displayed on another display device, such as a video display window that has been opened by software application 104.

Network 110 may be any technically feasible type of communications network that allows data to be exchanged between computing system 100 and external entities or devices, such as a hosted website or server machine. Examples of network 110 may include a wide area network (WAN), a local area network (LAN), a wireless (WiFi) network, and/or the Internet, among others.

Memory 103 may be a hard disk, a flash memory stick, a compact disc read-only memory (CD-ROM), a random access memory (RAM) module, or any other type of volatile or non-volatile memory unit capable of storing data. Memory 103 includes various software programs that can be executed by processor 101, including software application 104, video capture application 105, and web-browser 106, each of which are described in greater detail below in conjunction with FIG. 2.

It will be appreciated that the configuration of computing system 100 described herein is illustrative and that variations and modifications are possible. Any technically feasible connection topology, including various arrangements of bridges or additional processors, falls within the scope of the present invention. For instance, in some embodiments, memory 103 and/or other devices may be connected to processor 101 through a memory bridge rather than directly. In other alternative topologies, processor 101 may include a separate display processor. In addition, the configuration of computing system 100 described herein may include additional and/or optional components. For instance, any number of add-in cards or peripheral devices may be included.

Figure 2:
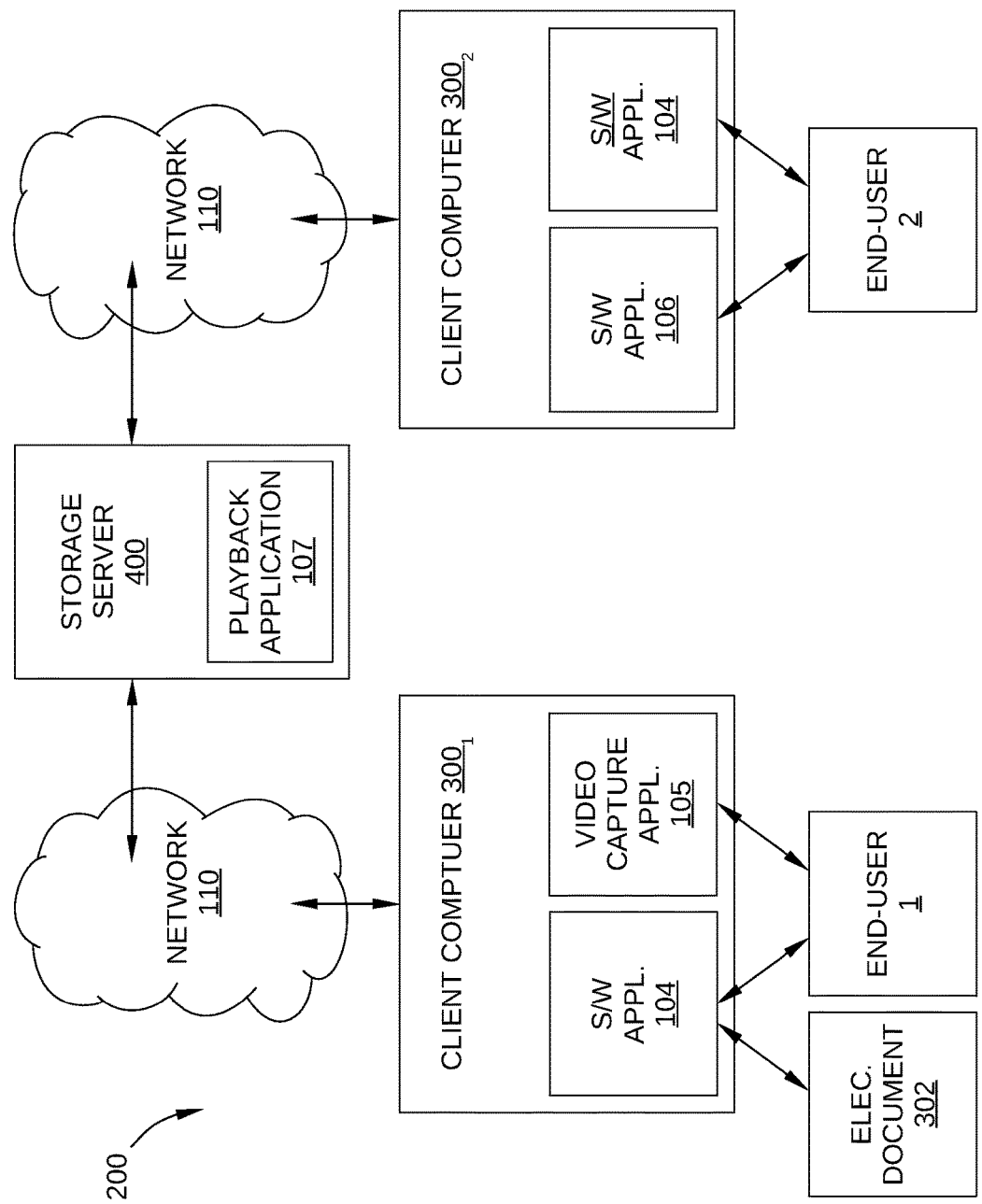
FIG. 2 illustrates a conceptual diagram of a web-based system for capturing, uploading, and sharing instructional workflow videos, according to one embodiment of the present invention.

FIG. 2 illustrates a conceptual diagram of a web-based system 200 for capturing, uploading, and sharing instructional workflow videos, according to one embodiment of the present invention. As shown, web-based system 200 includes a client computing system 3001, a storage server 400, and a second client computing system 3002. Client computing system 3001 is configured for an experienced end-user of software application 104 to generate and upload an instructional workflow video for software application 104, and client computing system 3002 is configured for locating and viewing such instructional workflow videos for software application 104. Client computing systems 3001 and 3002 may be substantially similar in operation and organization to computing system 100, described above in conjunction with FIG. 1. In the configuration of web-based system 200 illustrated in FIG. 2, computing systems 3001 and 3002 are depicted as two distinct systems, however, in other embodiments, a single computing system similar to computing system 100 may be used as both computing system 3001 and computing system 3002.

In operation, web-based system 200 allows an experienced end-user of software application 104, i.e., end-user 1, to capture and edit workflow videos related to the use of software application 104, such as instructional videos. Specifically, end-user 1 uses video capture application 105 to capture a workflow video of software application 104 while using software application 104 to create and/or modify an electronic document 302. In some embodiments, a workflow video created in this way is uploaded to storage server 400 via continuous streaming by video capture application 105 concurrently with the video capture process, and in other embodiments the workflow video is uploaded to storage server 400 by video capture application 105 after the video capture process is complete. Furthermore, video capture application 105 can be configured to capture meta-data associated with software application 104 during the video capture process, such as software product, product version, user skill level, creator name, specific commands or tools used to create content of an electronic document, date of creation, category of activity used to generate an electronic document, and the like. The captured metadata is also uploaded to and stored on storage server 400 by video capture application 105. Embodiments of such a video capturing and editing process is described in greater detail below in conjunction with FIGS. 4 and 5.

In operation, web-based system 200 also allows a less-experienced end-user of software application 104, i.e., end-user 2, to efficiently locate and view workflow videos created with video capture application 105 and stored on storage server 400. By accessing storage server 400 via web-browser 106, end-user 2 can use a playback application 107 to search through all workflow videos stored on storage server 400 and view any workflow videos selected in the search. It is noted that playback application 107 is presented to end-user 2 as part of a website, rather than within a local client application residing on client computing device 3002. It is further noted that the metadata captured by video capture application 105 and associated with each workflow video stored on storage server 400 greatly facilitates searches for videos of particular interest to end-user 2. This is because many more search parameters are available than simply terms used in the title of each video. End-user 2 can efficiently search through a very large number of workflow videos using various filtering criteria, i.e., search parameters, such as software product, product version, user skill level, creator name, specific commands or tools used to create content of an electronic document, date of creation, etc. The process of viewing workflow videos stored on storage server 400 is described in greater detail below in conjunction with FIGS. 5-10.

Figure 3:
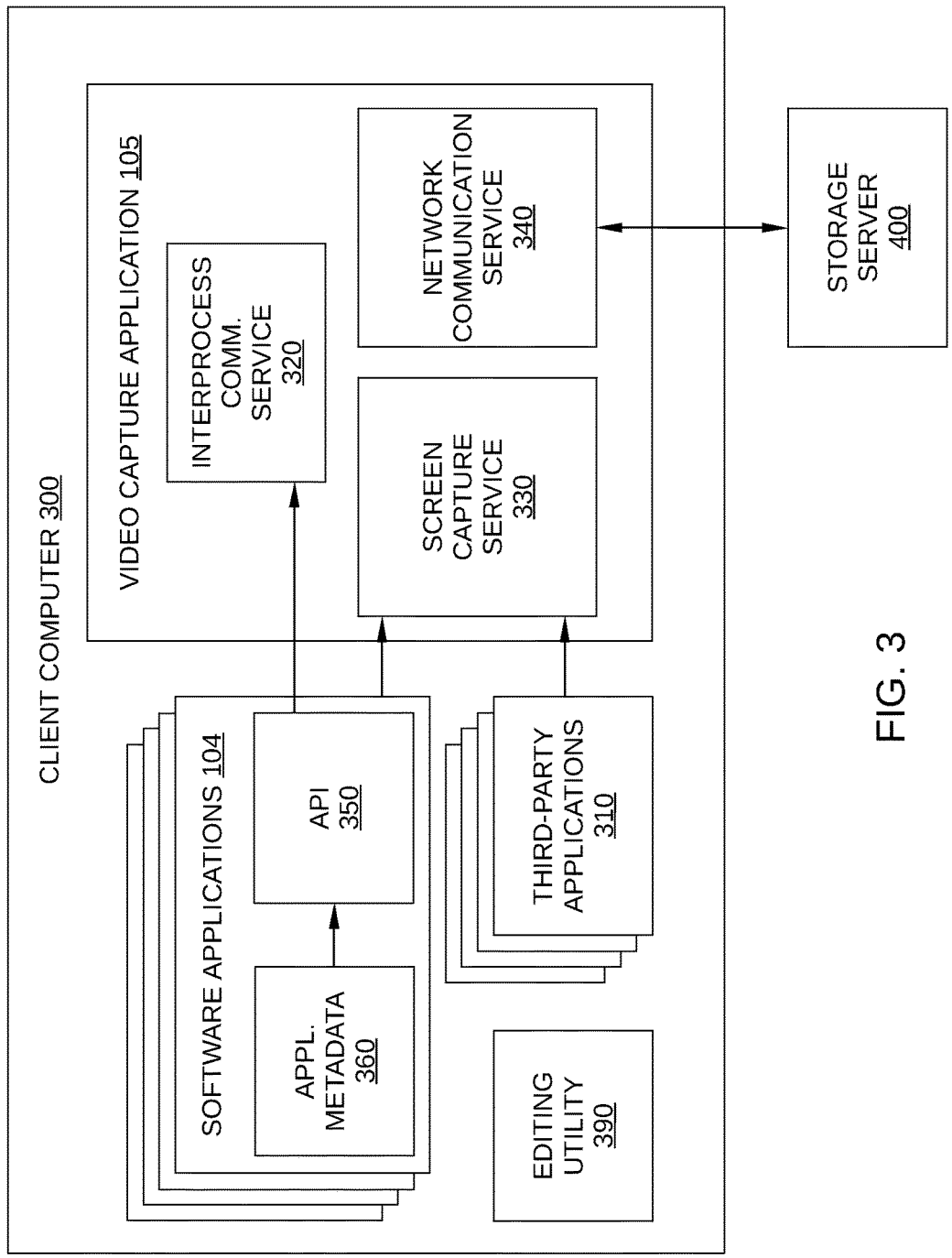
FIG. 3 is a conceptual diagram of client computing system and a video capture application, according to one embodiment of the present invention.

FIG. 3 is a conceptual diagram of client computing system 300 and video capture application 105, according to one embodiment of the present invention. As shown, client computing system 300 includes one or more software applications 104, video capture application 105, and one or more third party software applications 310. The description of client computing system 300 in conjunction with FIG. 3 is applicable to both client computing system 3001 and client computing system 3002 in FIG. 2. For clarity, other elements of the architecture of computing system 300, such as processor 101, I/O devices 102, and display device 120, are omitted from FIG. 3.

Software application 104 may be any software application designed to generate and edit documents, images, videos, or any other type of user-defined content, and comprises program instructions that can be executed by processor 101. For example, software application 104 may be a sketching or drawing program or a computer-aided design program, such as the Paint.NET application, which is an open-source raster-based image editing application written in the C# programming language. End-user 1 may generate electronic document 302 with software application 104 and store electronic document 302 in a memory included in computing system 300 (end-user 1 and electronic document 302 are shown in FIG. 2). In some embodiments, electronic document 302 is an image stored in a compressed file format, such as the JPEG image file format. In alternative embodiments, electronic document 302 may be a text document, such as a Microsoft Word™ document file. In other embodiments, electronic document 302 may include media content such as a video file compressed using an MPEG codec. In yet other embodiments, electronic document 302 may be a computer-aided design (CAD) model, which may be an assembly of one or more parts that include defined volumes, surfaces, or vertices.

Each of the one or more software applications 104 incorporate an application programming interface (API) 350 configured to capture application metadata 360 as end-user 1 works with software application 104 to create and/or modify electronic document 302. Thus, in some embodiments, software applications 104 are configured to provide the necessary hooks specified by API 350 to facilitate the capture of application metadata 360.

Application metadata 360 may include a wide variety of information associated with software application 104, end-user 1, and the particular workflow video being generated by video capture application 105. For example, application metadata 360 may include event history information associated with the particular workflow video being generated by video capture application 105, such as what commands or tools in software application 104 are used by end-user 1 to modify electronic document 302 as well as an associated timestamp for each such event. Other event information in application metadata 360 may include when mouse controls are actuated in the workflow being video captured as well as which mouse controls are actuated, e.g., left-click, right-click, scroll-up, etc. Generally, event information included in application metadata 360 is transmitted to video capture application 105 whenever an event of interest takes place. In other embodiments, such event information may be stored internally as a list of events by a suitably configured software application 104, and video capture application 105 may be configured to poll software application 104 to retrieve information related to such a list of events.

In some embodiments, application metadata 360 may also include extended description information inserted by end-user 1, such as accompanying descriptions related to operations currently being performed in the workflow or other tips or information associated with the workflow video being generated. For example, extended description information may include static text and/or voice narration that clarifies what is being visually presented to an end-user who views the workflow video. In some embodiments, application metadata may include settings for one or more features selected by end-user 1 when performing the workflow being captured. In other embodiments, such description information may be added during an editing process subsequent to the video capture process.

Video capture application 105 is a client-based software application configured to perform screen captures of software application 104 while end-user 1 creates and/or modifies electronic document 302 using software application 104. Video capture application 105 may be configured as an application that is run locally on client computing system 300 and includes the functionality for starting, pausing, ending, and uploading workflow videos of software application 104. In some embodiments, video capture application 105 and software application 104 are separate processes executing in a multitasking operating system environment on processor 101. In other embodiments, video capture application 105 and software application 104 may be included within a single process executing on processor 101. In some embodiments, video capture application 105 is an add-in for software application 104, such as a snap-in, a plug-in, or an extension.

In the embodiment illustrated in FIG. 3, video capture application 105 includes an inter-process communication service 320, a screen capture service 330, and a network communication service 340, although other technically feasible configurations of video capture application 105 also fall within the scope of the present invention. Inter-process communication service 320 is configured to facilitate inter-process communication between video capture application 105 and the one or more software applications 104, such as receiving application metadata 360 during the video capture process. It is noted that third party applications 310, which by definition do not include API 350, are not configured to facilitate the capture of application metadata 360 during the video capture process. Consequently, inter-process communication service 320 generally does not receive application metadata 360 from third party applications 310. Screen capture service 320 is configured to capture a plurality of sequential screen shots for use as frames in a workflow video of software applications 104 and third party applications 310. Network communication service 340 facilitates communication between client computing device 300 and storage server 400 via network 110.

In some embodiments, video capture application 105 receives application metadata 360, which may include notifications of events generated by software application 104, and stores the events and other application metadata 360 remotely as a data object 410 (shown in FIG. 5) on storage server 400. In one embodiment, video capture application 105 generates a data object 410 on storage server 400 for each event generated by software application 105. In some embodiments, each of data objects 410 is generated as an associated event occurs, and in other embodiments, data objects 410 are generated on storage server 400 for a particular workflow video after video capture of the video has stopped. Each data object 410 may include information related to an event generated by software application 104 as well as a timestamp corresponding to when that particular event was generated by software application 104. The timestamp may be an absolute time, such as a time related to a computer clock of client computing system 300, or a relative time, such as an elapsed time since electronic document 302 was created.

Video capture application 105 may be configured to capture a screenshot (i.e., a digital image) of a main application window associated with software application 104 when an event is generated by software application 104. These screenshots, along with any captured video data, may be stored in image data 420 (shown in FIG. 5), and may be associated with one or more data objects 410 for a particular workflow video stored in storage server 400. In one embodiment, each screenshot is stored in a compressed file format such as a JPEG file format. In alternative embodiments, the bit depth of the captured image may be reduced to minimize the size of the memory required to store image data 420. For example, the screen resolution of display device 120 in the native application environment may be 800×600 at 24 bpp (bits per pixel). Such a resolution corresponds to each color component (e.g., red, green, and blue) being encoded with 8 bits. In contrast, the screenshot may be stored in a 16 bpp color depth, such as by using a 565 mode where the red and blue channels are each encoded with 5 bits and the green channel is encoded with 6 bits. Using a reduced color depth in this way to store image data 420 may reduce the memory requirements of storage server 400. In another embodiment, metadata 360 associated with a screenshot may be stored along with the screenshot in image data 420.

In some embodiments, video capture application 105 is configured to capture mouse cursor position information and/or mouse button-use information in a separate thread from the video screen captures used to create a workflow video. In such embodiments, the separately captured mouse cursor position information and/or mouse button-use information may be captured at a higher frame rate than the video capture of software application 104 being performed. Because video capture is generally a CPU intensive process, the frame rate of video capture of software application 104 performed by video capture application 105 may be relatively low, for example 10 frames per second. At such frame rates, quick movements of a mouse cursor in a workflow video of end-user 1 using software application 104 may appear choppy and difficult to track when the workflow video is played back by an end-user. By capturing mouse cursor position information at a higher frame rate, a workflow video can be generated in which mouse cursor movements are overlayed on the screen shot-based workflow video, the mouse cursor movement being refreshed at the higher frame rate and therefore appearing smoother and easier to track by an end-user viewing the workflow video. One such embodiment of workflow video playback is described below in conjunction with FIGS. 11A and 11B. It is noted that in such embodiments, API 350 and inter-process communication service 320 may also be modified to facilitate the capture of such mouse cursor movement information and/or mouse button-use information in a separate thread.

In some embodiments, video capture application 105 can be configured with an editing utility 390 to edit captured workflow videos that have associated metadata, such as application metadata 360. Editing utility 390 of video capture application 105 may include a user interface that provides end-user 1 with the capability to delete specific portions of a captured workflow video and/or insert voice-over narration, static text, and the like. For example, editing utility 390 may provide end-user 1 with a graphical interface (GUI) that provides functionality to generate or modify a selected workflow video, including any of workflow videos stored on storage server 400. For example, the GUI for editing utility 390 may include menus, toolbars, a document frame, and one or more dialog boxes. In other embodiments, workflow editing may be performed on a different client computer or via an application on storage server 400.

Application metadata 360 is time-stamped, and therefore the events contained in application metadata 360 are synchronized with an associated captured workflow video. Consequently, simply removing specific frames from a captured workflow video causes events and other metadata that occur after the point in time at which frames are removed to have irrelevant time stamps. In some embodiments, in addition to editing workflow videos, editing utility 390 may be advantageously configured to track and modify timestamp information associated with events that take place in a workflow video at a point in time after one or more frames have been removed from the workflow video. In some embodiments, editing utility 390 correctly offsets timestamp information from pre-edited values. In this way, metadata 360 associated with events that occur in a workflow video after frames have been removed are still properly synchronized with the workflow video when said video is played back. In some embodiments, editing utility 390 may also be configured with a visually-oriented navigation functionality that allows end-user 1 to efficiently navigate through the many frames of a particular workflow video. One embodiment of such a visually-oriented navigator is described below in conjunction with FIGS. 6A and 6B.

Furthermore, editing utility 390 may be configured to modify application metadata 360 in other ways in response to the deletion of frames. For example, if a specific event, such as the use of a particular tool, takes place exclusively inside a portion of a workflow video that is removed, editing utility 390 also removes the metadata associated with the event. On the other hand, if the event takes place during the removed portion of the workflow video and also during a remaining portion of the workflow video, editing utility 390 removes metadata associated with the event that takes place during the removed portion of the workflow video. If desired, in such embodiments, editing utility 390 modifies the metadata associated with the portion of the event that takes place in the remaining portion of the workflow video. For example, command metadata that begins prior to and extends into the removed portion of a workflow video can be repaired with the addition of a termination mark associated with the command in question. In this way, the termination mark for the command that is removed during the editing process is replaced with a termination mark time-stamped with a revised time, the revised time corresponding to the point in time in the edited workflow video corresponding to the removed portion. One of skill in the art can, upon reading the disclosure herein, readily devise additional modifications to application metadata 360 that can be advantageously performed by editing utility 390 in response to the deletion of frames from a workflow video.

In some embodiments, editing utility 390 may be configured to facilitate the selection of a representative thumbnail image for a particular workflow video. In some embodiments, editing utility 390 is configured to present a default representative thumbnail image for a workflow video being edited by end-user 1. In some embodiments, editing utility 390 may select as the default thumbnail a video frame from the portion of the workflow video that is shown for the longest duration without changes being made to electronic document 302. In other embodiments, editing utility 390 is configured with a functionality that allows end-user 1 to select any frame in the workflow video being edited. For example, a timeline navigator may be displayed that can be navigated by end-user 1 to any frame in the workflow video. In other embodiments, editing utility 390 is configured with a functionality that allows end-user 1 to insert an image that is not derived from a frame of the workflow video, such as a high quality rendering of the subject matter of the workflow video. In other embodiments, editing utility 390 is configured to use a portion of a desired frame of the workflow video. In such an embodiment, a bounding rectangle may be provided by editing utility 390 so that end-user 1 can select a desired portion of a specific frame of the workflow video.

Figure 4:
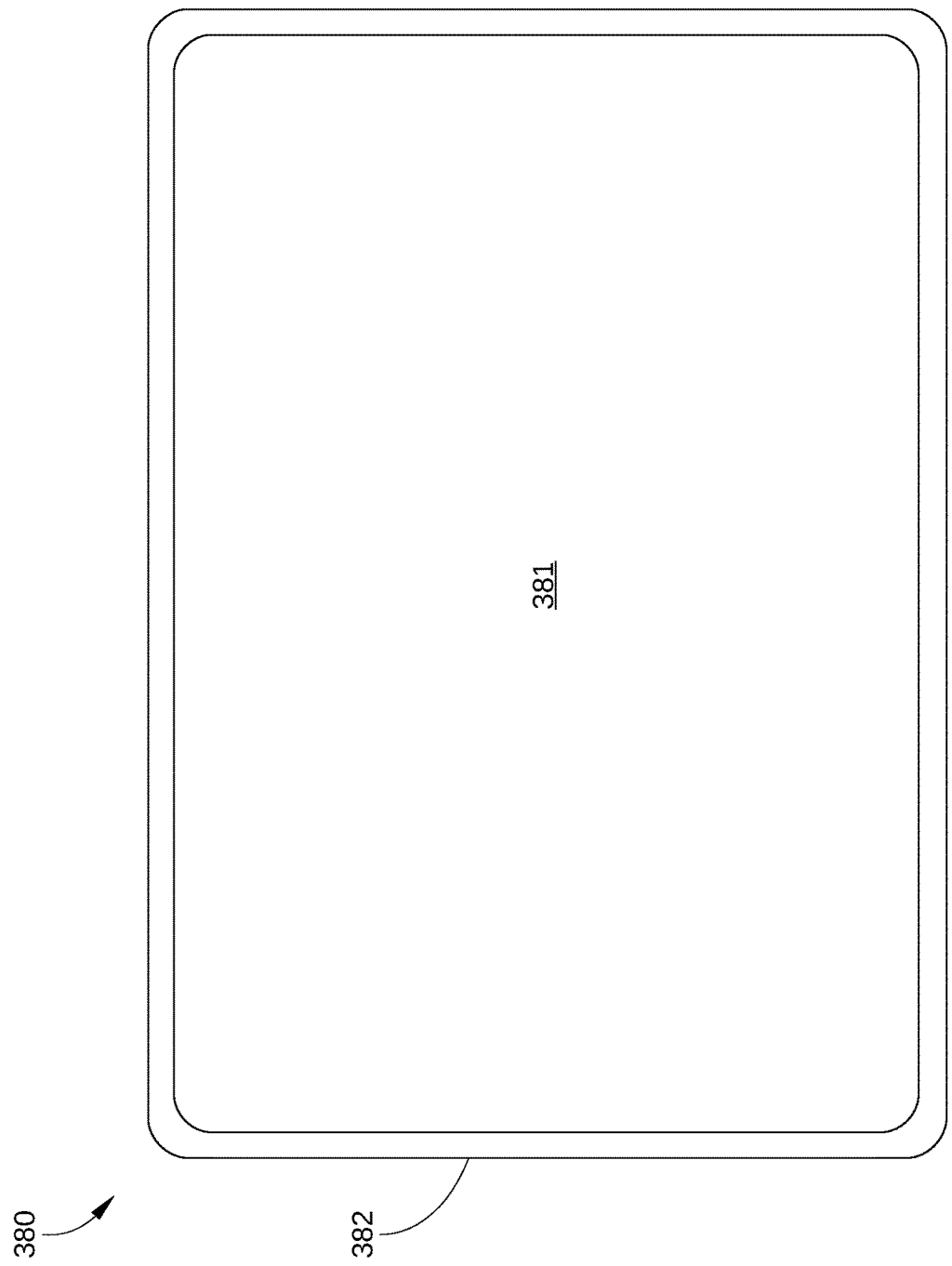
FIG. 4 illustrates an interactive screen recording bounding box, according to one embodiment of the present invention.

In some embodiments, video capture application 105 is configured with an interactive graphical user interface to facilitate screen and video captures as software application 104 is used by end-user 1. FIG. 4 illustrates an interactive screen recording bounding box 380, according to one embodiment of the present invention. Interactive screen recording bounding box 380 includes a capture window 381 and a border 382 that surrounds capture window 381. While video capture application 105 and software application 104 are running, interactive screen recording bounding box 380 is generally visible on display device 120, so that end-user 1 can readily determine the current recording status, i.e., recording, paused, or targeted in software application 104. Border 382 may be color-coded to indicate such status, e.g., green=software application 104 is targeted by video capture application 105; red=recording; gray=paused. In addition, the colored status indicators may be augmented by text display disposed somewhere within border 382. In some embodiments, border 382 comprises an interactive border, so that when end-user 1 clicks on border 382, screen recording bounding box 380 and the underlying foremost window of software application 104 snaps to an optimal recording aspect ratio, e.g., 16:10. For example, when the window of interest in software application 104, which for end-user 1 is presumably the foremost window, is resizable, clicking on border 382 causes video capture application 105 to resize both interactive screen recording bounding box 380 and the foremost window of software application 104 to a predetermined optimal aspect ratio.

Figure 5:
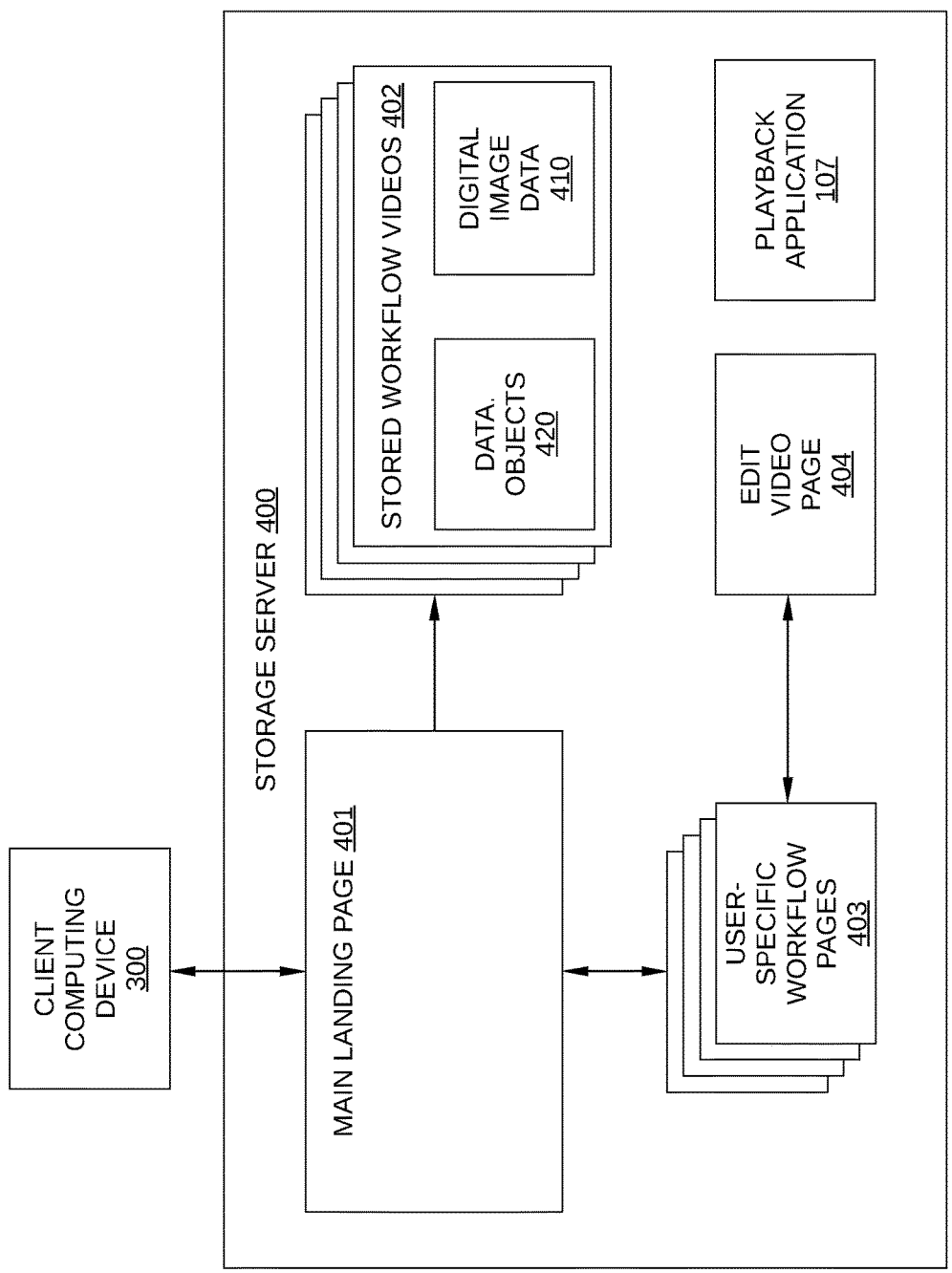
FIG. 5 is a conceptual diagram of a storage server, according to one embodiment of the present invention.

FIG. 5 is a conceptual diagram of storage server 400, according to one embodiment of the present invention. Storage server 400 hosts a workflow video archive website, and includes a main landing page 401, one or more stored workflow videos 402, one or more user-specific workflow pages 403, an edit video page 404, and a playback application 107. As shown, storage server 400 is accessible via network 110.

Main landing page 401 provides access to the workflow video archive, i.e., stored workflow videos 402. In addition, main landing page 401 includes user registration, password-protected sign-in, and search capability for stored workflow videos 402. Search results are generally presented in main landing page 401.

Stored workflow videos 402 are workflow videos generated by one or more skilled end-users, such as end-user 1 in FIG. 2. Stored workflow videos 402 may include workflow videos for a variety of software applications, rather than for a single software application. Furthermore, some or all of stored workflow videos 402 may be workflow videos that are not generated or produced by the manufacturer of the subject software application. Consequently, a wide range of skilled users of one or more software applications may contribute workflow videos to stored workflow videos 402. Thus, end-user 1 is only one example of a contributor that stores workflow videos 402, and software application 104 is only one of many software applications that may be the subject of one or more stored workflow videos 402. Stored workflow videos 402 may be completed workflow videos and/or partially edited workflow videos. In some embodiments, the creator of a particular stored workflow video 402 may assign an access state to the workflow video, i.e., publicly accessible, private, unpublished, hidden, etc.

Each of stored workflow videos 402 includes digital image data 420, which are described above in conjunction with FIG. 3. In addition, one or more of stored workflow videos 402 also includes one or more data objects 410, which include events and other application metadata 360 associated with digital image data 420 in a specific stored workflow video 402. The generation and storage of data objects 410 is described above in conjunction with FIG. 3. Stored workflow videos 402 that include data objects 410 can be searched for by end users such as end-user 1 and end-user 2 using search parameters based on information contained in data objects 410. For example, end-user 2 can search through all stored workflow videos 402 on storage server 400 by product, product version, user skill level, title, description, creator name, date of creation, and tools or commands used in a workflow, among others. This search capability is provided by storage server 400 and the association of data objects 410 with stored workflow videos 402, and allows an end-user to quickly search through stored workflow videos 402 to find examples of work related to specific tools of a particular application, such as software application 104.

User-specific workflow pages 403 are user account pages that show a skilled users what stored workflow videos the skilled user has uploaded to storage server 400. When a specific stored workflow video 402 is accesses by an end-user via a user-specific workflow page 403, the stored workflow video 402 is opened in the edit video page 404 for editing. Edit video page 404 is described below.

Edit video page 404 provides a skilled user, such as end-user 1, editing capability over existing stored workflow videos 402 for which the skilled user is the creator. Such editing capability can be substantially similar to the editing capability described above in conjunction with FIG. 3 for editing utility 390. Edit video page 404 may also be configured with a visually-oriented navigation functionality that provides an interactive and intuitive means for end-user 1 to efficiently navigate through the many frames of a particular workflow video. One embodiment of an interactive and visually-oriented navigation is described below in conjunction with FIGS. 6A and 6B.

Figure 6A:
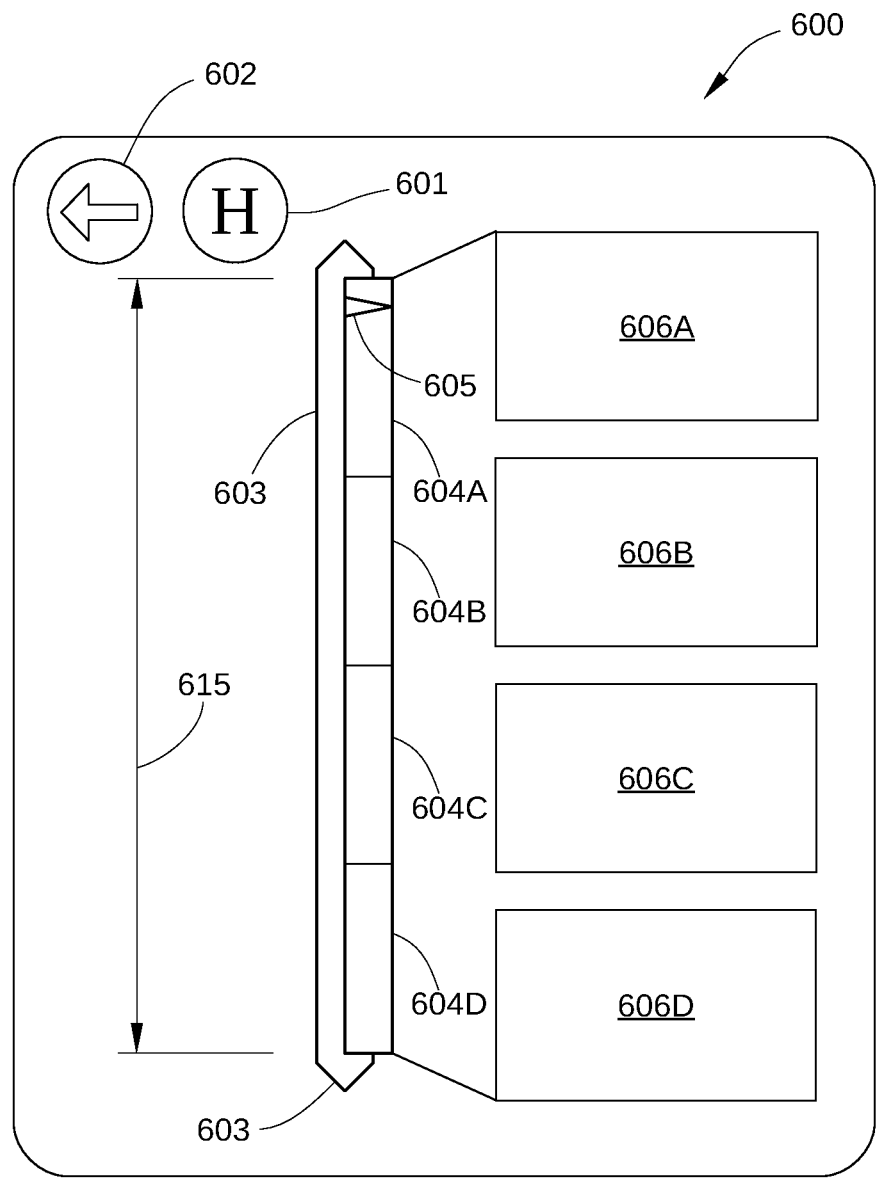
FIGS. 6A and 6B illustrate a visually-oriented navigation interface, according to one embodiment of the present invention.
Figure 6B:
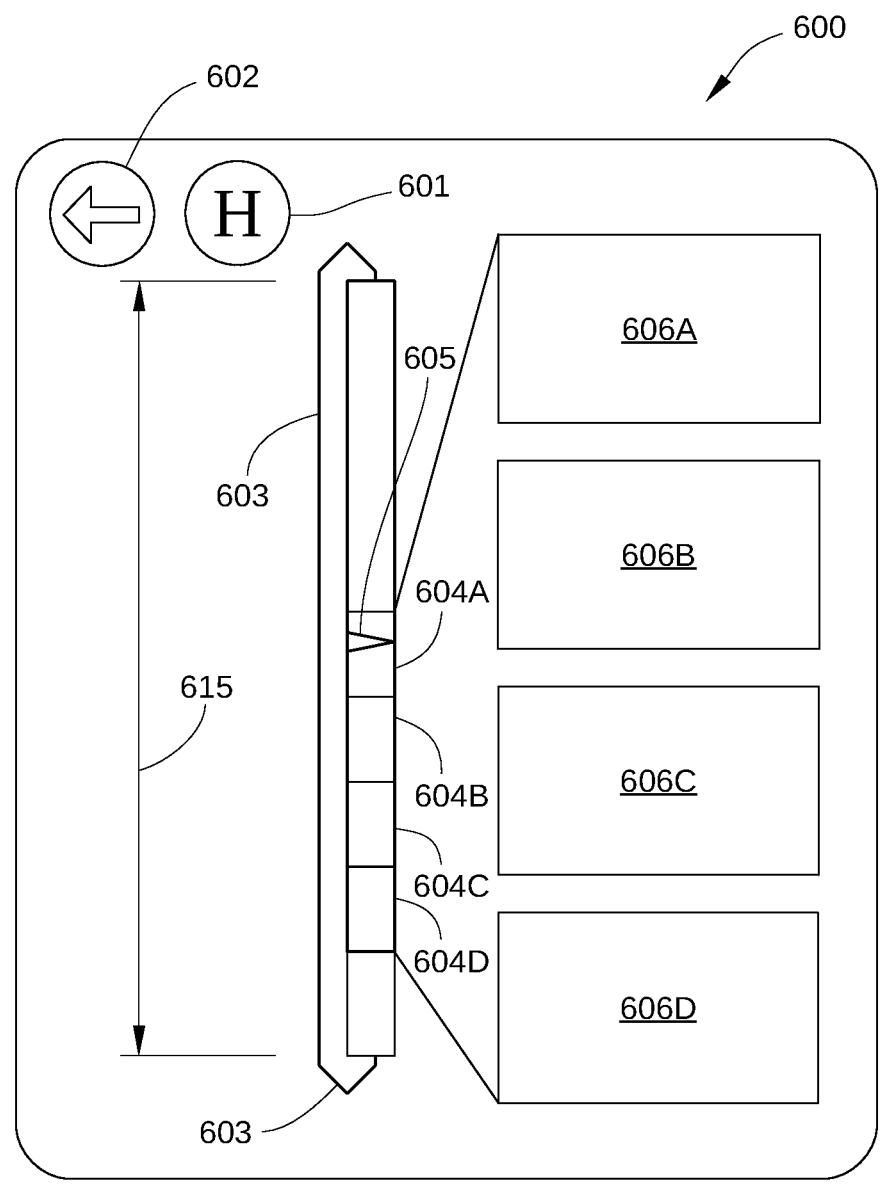

FIGS. 6A and 6B illustrate a visually-oriented navigation interface 600, according to one embodiment of the present invention. Navigation interface 600 is configured to facilitate navigation to any portion of a workflow video with only a small number of actions—even for workflow videos that include a very large number of video frames. This is because the graphical representations, i.e. thumbnail images, used in navigation interface 600 are associated with a hierarchy having finer and finer levels of detail. Generally, navigation interface 600 may be displayed adjacent to a playback window in which a particular workflow video is being played. Such a playback window may be used by end-user 1 as part of the editing and reviewing process or by end-user 2 as part of a learning process. FIG. 6A shows navigation interface 600 when displaying thumbnails 610 at a home level. Navigation interface 600 includes a home button 601, a back button 602, a navigation handle 603, multiple section indicators 604A-604D, a play position indicator 605, multiple thumbnail images 606A-606D, and connecting elements 630 disposed between multiple thumbnail images 606A-606D.

Clicking on home button 601 returns navigation interface 600 to the home level, as shown in FIG. 6A. Clicking on back button 602 returns interface 600 to the previous zoom level displayed by navigation interface 600. Dragging navigation handle 603 vertically causes panning across a timeline of the currently displayed workflow video. It is noted that at the home level, navigation handle 603 spans the entire duration 615 of the workflow video, and therefore cannot be dragged vertically. At a lower level of navigation, such as that illustrated in FIG. 6B, navigation handle 603 can be dragged vertically. Section indicators 604A-604D indicate what portion of the workflow video is represented by a particular thumbnail image 606A-606D. Consequently, for each of thumbnail images 606A-606D displayed by navigation interface 600, there is a corresponding respective one of section indicators 604A-604D shown adjacent to navigation handle 603. Play position indicator 605 shows the current time in the workflow video that is being viewed. The multiple thumbnail images 606A-606D are displayed to provide an end-user with a clear visual presentation of different steps in the process of modifying an electronic document. Connecting elements 630 may be used to provide additional zoom capability as described below.

At the home level, the thumbnails 606A-606D that are displayed by navigation interface 600 are distributed across the entire duration 615 of the workflow video, as shown in FIG. 6A. At lower levels, navigation interface 600 zooms in to a specific portion of the workflow video, and the thumbnail images 606A-606D displayed by navigation interface 600 are selected from the zoomed-in portion of the workflow video, rather than from the entire duration of the workflow video.

In some embodiments, the distribution of thumbnail images 606A-606D is not necessarily uniformly distributed along a timeline of the workflow video. Instead, an algorithm may be used to determine what portion of the workflow video is represented by each of thumbnail images 606A-606D. Thus, section indicators 604A-604D may not be of equal length. In some embodiments, the algorithm selects the segments of a workflow video represented by each of thumbnail images 606A-606D based on the distribution in time of events occurring in the workflow video, so that approximately equal numbers of events occur in each segment of the workflow video represented by one of thumbnail images 606A-606D. In other embodiments, the algorithm selects the segments of a workflow video represented by each of thumbnail images 606A-606D based on the time duration of each segment, so each segment of the workflow video represented by one of thumbnail images 606A-606D is approximately equal in duration. In yet another embodiment, the algorithm selects the segments of a workflow video represented by each of thumbnail images 606A-606D based on a combination of each of the above two criteria.

FIG. 6B shows navigation interface 600 when fully collapsed and displaying thumbnails 610 at a lower, or "zoomed-in" level. As shown, navigation handle 603 only extends along a portion of duration 615 of the workflow video, and section indicators 604A-604D are sized and positioned to indicate what portion of duration 615 are respectively represented by thumbnail images 606A-606D. Clicking on any of thumbnail images 606A-606D results in that thumbnail image being expanded into different multiple thumbnail images 606A-606D. Thus, because navigation interface 600 is organized as a hierarchy of branching sets of visual position indicators, an end-user can navigate to any particular portion of the workflow video in a small number of selection actions. This is in contrast to conventional thumbnail-based navigation interfaces, which either 1) consist of a small number thumbnail images to assist navigation and have very poor granularity of position or 2) include such a large number of thumbnail images that navigation is difficult.

In some embodiments, navigation interface 600 includes additional zoom, seek, and navigation functionality. For example, navigation interface 600 may include a color-coded timeline for a more intuitive indication of the location of a particular segment of a workflow video that corresponds to a particular thumbnail image. In one such embodiment, hovering a mouse cursor over one of thumbnail images 606A-606D results in the corresponding section indicator to change color and/or causes a tooltip window to appear that includes a text callout indicating what portion of the workflow video is represented by the thumbnail image being hovered over. Clicking on the callout may cause navigation interface 600 to zoom to the segment indicated in the callout. In some embodiments, clicking on one of thumbnail images 606A-606D causes navigation interface 600 to seek to the segment represented by the clicked thumbnail image so that play position indicator 605 moves to that location in the video.

Is some embodiments, additional zoom capability is provided by connecting elements 630 (cross-hatched). As shown, each of connecting elements 630 is disposed between two adjacent thumbnail images 606A-606D. In such embodiments, connecting elements 630 are interactive regions. Hovering over one of connecting regions 630 with a mouse cursor may display the video time that corresponds to the segment of a workflow video disposed between the two adjacent thumbnail images. Clicking in one of connecting regions 630 may cause navigation interface 600 to zoom the video timeline to the region starting at the first of the two thumbnail images and ending at the second of the two thumbnail images disposed adjacent the connecting region 630.

Referring back to FIG. 5, storage server 400 includes playback application 107, which allows end-user 2 to search through all accessible stored workflow videos 402 and view any of stored workflow videos 402 selected in the search. As noted above, playback application 107 is presented to end-user 2 as part of the workflow video archive website located on storage server 400, rather than within a local client application residing on client computing device 3002. Thus, an end-user can browse to the specific uniform resource locator (URL) designated for a particular stored workflow video 402. In some embodiments, playback application 107 includes navigation interface 600, which is described above in conjunction with FIGS. 6A and 6B. In addition, playback application 107 may provide a graphical user interface that includes multiple display windows. One such embodiment is illustrated in FIG. 7.

Figure 7:
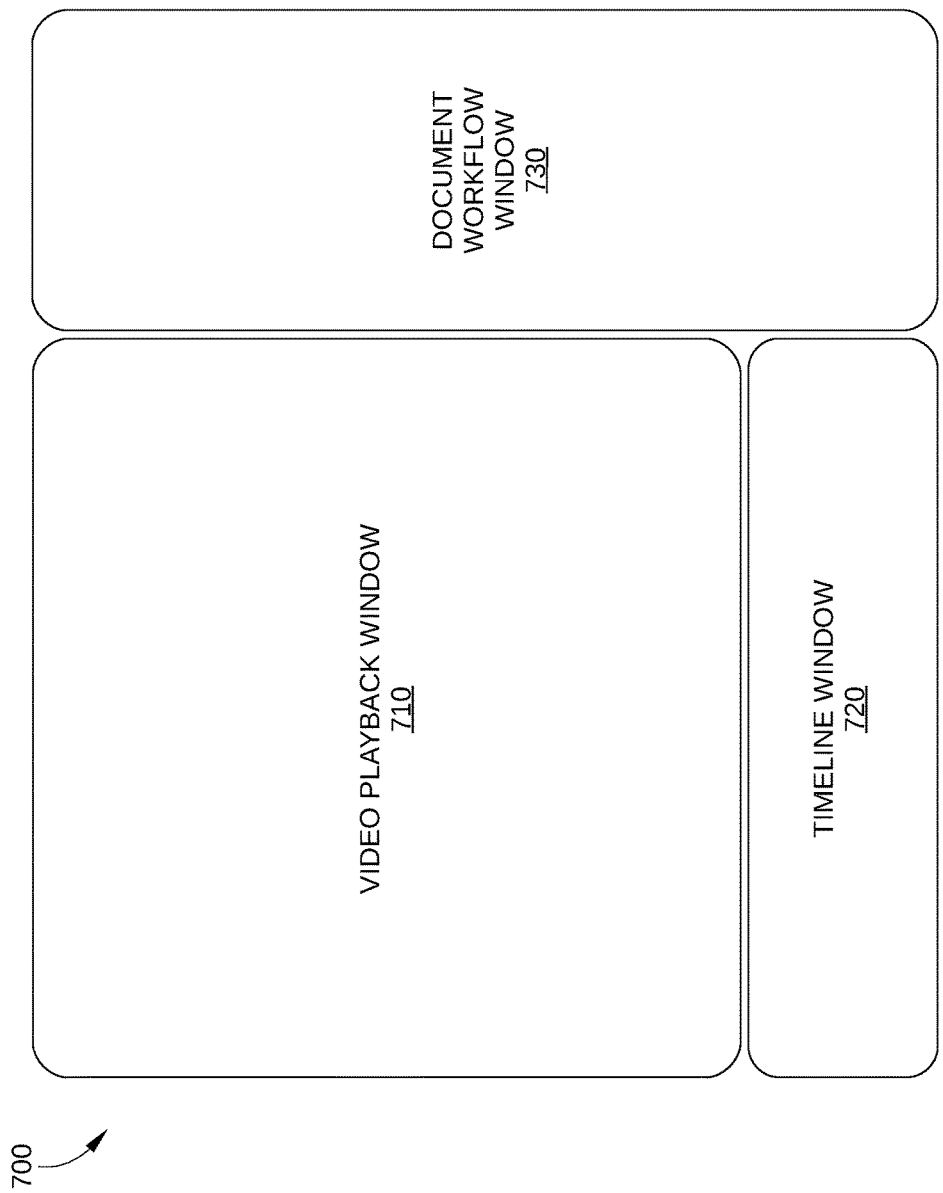
FIG. 7 illustrates a graphical user interface provided by a playback application, according to one embodiment of the present invention.

FIG. 7 illustrates a graphical user interface (GUI) 700 provided by playback application 107, according to one embodiment of the present invention. GUI 700 includes a video playback window 710, a timeline window 720, and a document workflow window 730. Video playback window 710 may be resized to enable timeline window 720, and document workflow window 730 to be displayed on display device 120 proximate to video playback window 710. Document workflow window 730 may include one or more graphical representations of events included in a workflow video being played back. In one embodiment, document workflow window 730 is substantially similarly to navigation interface 600 described above in conjunction with FIGS. 6A and 6B.

Timeline window 720 may be configured to display a timeline object that includes one or more tracks of information related to the events generated by software application 104 or any other application used to generate the workflow video. Each track of information may include one or more marker objects corresponding to events that were generated by software application 104. In some embodiments, tracks of information may in timeline window 720 are not limited to a set of tracks defined by playback application 107 or video capture application 105. In such embodiments, one or more tracks of information in timeline window 720 may be defined by software application 104 itself rather than by video capture application 105. The timeline object may be configured such that the marker objects are arranged on the timeline object in a chronological order. Timeline window 720 may also include a timeline marker that identifies a position in a workflow video that is currently displayed. Timeline window 720 may also include one or more video controls that allow a user to play, rewind, or fast forward a workflow video being played. In some embodiments, timeline window 720 includes one or more metadata markers on one or more timelines, embodiments of which are illustrated in FIGS. 8 and 9.

Figure 8:
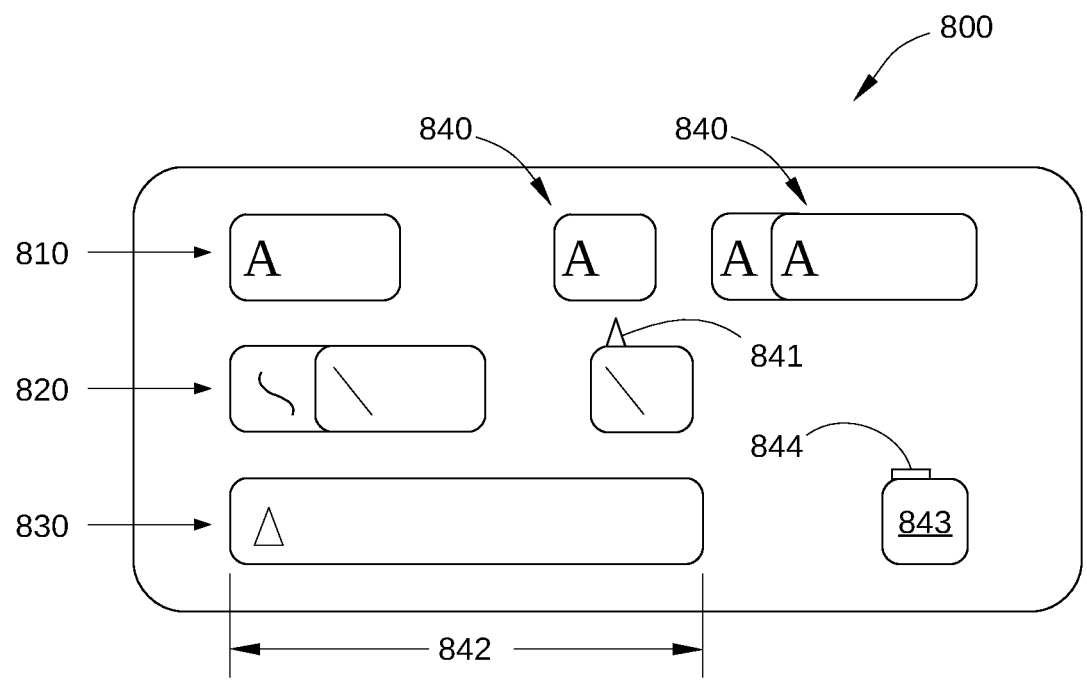
FIG. 8 illustrates a multi-track timeline that is used to visualize captured metadata, according to one embodiment of the present invention.
Figure 9:
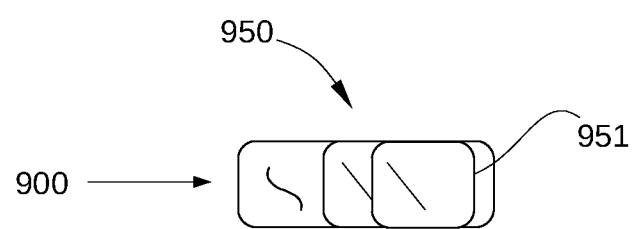
FIG. 9 illustrates a timeline with multiple overlapping time duration markers, according to one embodiment of the present invention.

FIG. 8 illustrates a multi-track timeline 800 that is used to visualize captured metadata, according to one embodiment of the present invention. Multi-track timeline 800 includes multiple tracks 810, 820, and 830, each of which may include multiple overlapping time duration markers 840 that indicate when events occur in the workflow video being played.

Time duration markers 840 can represent a specific instant in time or an interval in time in which a specific tool or command is used in the workflow video. An instant in time may represented by a pointed tip 841 or other feature on the time duration markers 840. A duration of time may be represented by a pixel width 842 of each of time duration markers 840. In practice, there is generally a minimum pixel width that is feasible for time duration markers 840, for example on the order of 10 to 20 pixels. Thus, in some embodiments, a time duration marker 843 having a time duration that is less than such a minimum pixel width depicts the time associated with time duration marker 843 with a rectangular tip 844 or other icon feature smaller than the minimum pixel width 845 of time duration marker 843.

In the embodiment illustrated in FIG. 8, time duration markers 840 are used to represent data, but in other embodiments one or more tracks of a multi-track timeline 800 can represent data in different ways. For example, one of tracks 810, 820, and 830 may be configured as a command track, and shows command icons, as is the case with time duration markers 840. In contrast, one of tracks 810, 820, and 830 may be configured as a color track, and shows which color has been selected. In another embodiment, a layer track shows a graphical representation of the number of layers that are currently present in a document, and an audio track show a graph of the current audio levels in the document.

In some embodiments, each of tracks 810, 820, and 830 includes time duration markers of a certain category of tool or command. For example track 810 may include time duration markers that indicate narration or narration-related activities, track 820 may include time duration markers that indicate when settings are modified, track 830 may include time duration markers indicating when different software products are used, etc. In some embodiments, time duration markers 840 include text and/or one or more icons to indicate what tool, command, setting, etc., is represented by the time duration marker. In some embodiments, as an end-user zooms in and out while viewing multi-track timeline 800, time duration markers 840 may be updated dynamically to accurately depict time durations indicated.

In some embodiments, when multiple time duration markers are on a single timeline, they may be depicted with a preferred z-order, as shown in FIG. 9. FIG. 9 illustrates a timeline 900 with multiple overlapping time duration markers 950, according to one embodiment of the present invention. Time duration markers 950 on timeline 900 overlay one another, with the rightmost marker 951 having the topmost z-order. In some embodiments, to facilitate visualizing what time duration markers are present on timeline 900, when a mouse cursor hovers over an occluded time duration marker (i.e., a marker with less than 50% of the time marker icon visible) on timeline 900, the occluded time duration marker is temporarily displayed with the topmost z-order. In some embodiments, a time duration marker that is temporarily displayed with topmost z-order is displayed with partial transparency, e.g., 75% transparency, to facilitate an end-user visualizing other time duration markers on timeline 900.

In some embodiments, playback application 107 includes a search capability that allows an end-user to quickly locate desired operations, commands, setting adjustments, and the like used by a skilled end-user in a workflow video while the workflow video is being viewed. In some embodiments, this search capability includes a text-based timeline search function. When a query is made via the text-based search function, time duration markers present on any timeline displayed in timeline window 720 are highlighted, such as time duration markers 840 and 950 described above in conjunction with FIGS. 8 and 9. In some embodiments, the video being played also jumps to the first highlighted instance that matches the text search term. In some embodiments, the text-based search includes a sub-string search, so that as each character is typed into the text search box, playback application 107 displays relevant search results and jumps to the first instance. As more characters are typed into the text search box, obsolete search results are no longer highlighted. In some embodiments, playback application 107 displays the first instance of a search result with an additional visual highlight, such as a brief animation, to facilitate detection by an end-user.

Figure 10:
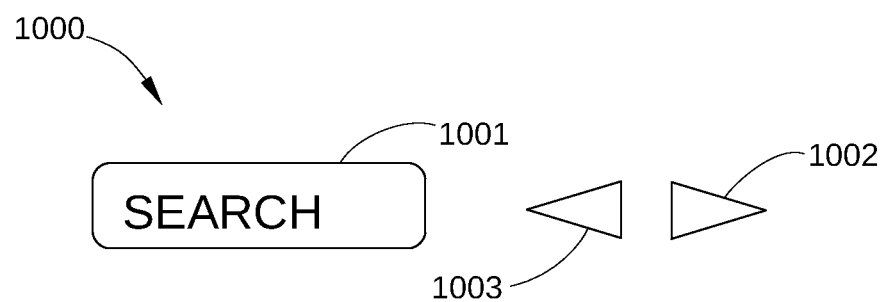
FIG. 10 illustrates a timeline search box, according to one embodiment of the present invention.

FIG. 10 illustrates a timeline search box 1000, according to one embodiment of the present invention. As shown, timeline search box 1000 includes a text-entry search bar 1001, a forward navigation button 1002, and a backward navigation button 1003. Forward navigation button 1002 and backward navigation button 1003 allow an end-user to navigate through the different instances of search results that are provided by timeline search box 1000.

In some embodiments, playback application 107 adds a graphical overlay to a workflow video to indicate the position of the mouse or to indicate one or more keys that were pressed on the keyboard. In some embodiments, the graphical overlay is displayed in addition to the system mouse cursor in the workflow video. As noted above in conjunction with FIG. 3, mouse and keyboard events may be captured and time-stamped for later synchronization to an associated workflow video. In some embodiments, playback application 107 can then display a mouse icon to indicate mouse-related events occurring in a workflow video, as described next in conjunction with FIGS. 11A-11B.

Figure 11A:
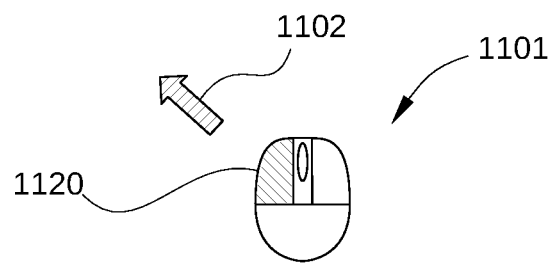
FIGS. 11A and 11B illustrate a graphical mouse overlay that may be used to indicate mouse position and/or mouse-related actions in a workflow video, according to one embodiment of the present invention.
Figure 11B:
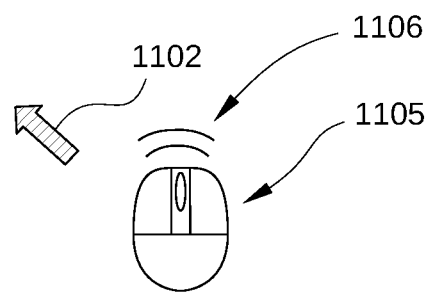

FIGS. 11A and 11B illustrate a graphical mouse overlay 1101 that may be used to indicate mouse position and/or mouse-related actions in a workflow video, according to one embodiment of the present invention. As shown in FIG. 11A, graphical mouse overlay 1101 may be disposed adjacent a system cursor 1102, which may also be rendered in the workflow video. In some embodiments, mouse-related actions are indicated in a workflow video by highlighting a region 1120 on the mouse icon that corresponds to the mouse-related action in question. For example, when a left-click action occurs in the workflow video, the left-click button of the mouse icon is highlighted. For scroll wheel functions, a radio effect, arrow, or other graphical presentation may be used to indicate upward and downward rotation of a scroll wheel. In FIG. 11B, graphical mouse overlay 1105 includes a radio effect 1106 to indicate that a scroll wheel on a mouse is rotated upward or forward by end-user 1 during recording of the workflow video.

In some embodiments, movement of a graphical mouse overlay is smoothed by interpolating the position of the graphical mouse overlay when the frame rate of a video playback is relatively low. Mouse position can be interpolated based on mouse position information captured concurrently with the original video capture and displaying the interpolated positions at a higher frame rate than the video playback frame rate. Alternatively, the mouse position information can be captured at a higher frame rate than the video capture rate and used to update the position of a graphical mouse overlay at the faster mouse position capture rate. In either case, mouse movement can be smoothed significantly, even when the frame rate of video playback is relatively low.

Figure 12:
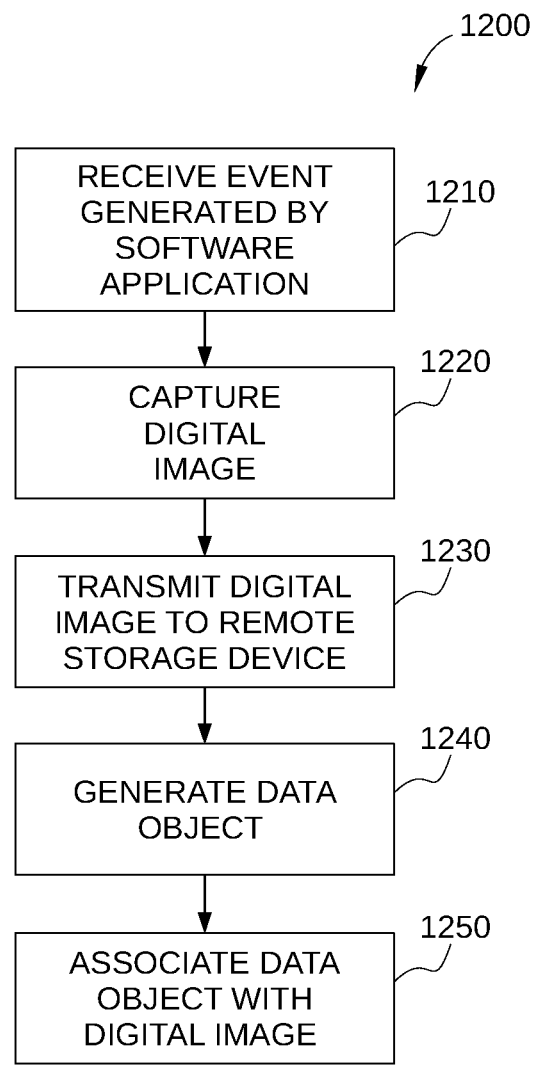
FIG. 12 is a flowchart of method steps for capturing a workflow history of an electronic document, according to one embodiment of the present invention.

FIG. 12 is a flowchart of method steps for capturing a workflow history of an electronic document, according to one embodiment of the present invention. Although the method steps are described in conjunction with the systems of FIGS. 1-10, persons skilled in the art will understand that any system configured to perform the method steps, in any order, is within the scope of the present invention.

As shown, a method 1200 begins at step 1210, where video capture application 105 receives an event that is generated by software application 104 and configured to modify the document. The event may be generated in response to a user command and may result in a modification to electronic document 302.

In step 1220, video capture application 105 captures a digital image that reflects a state of electronic document 302 at a point in the workflow history of the document corresponding to when software application 104 generated the event.

In step 1230, video capture application 105 transmits the digital image captured in step 1220 to a remote storage device for storage, such as storage server 400. The digital image may be used as part of a workflow video. In some embodiments, the digital image may be transmitted immediately after being captured, or saved with other digital images and transmitted to storage server 400 after the video capture process is complete.

In step 1240, video capture application 105 generates a data object that includes information related to the event, i.e., information contained in application metadata 360.

In step 1250, video capture application 105 associates the data object generated in step 1240 with the digital image captured in step 1220 and also with a portion of electronic document 302 that was modified as a result of the event.

Figure 13:
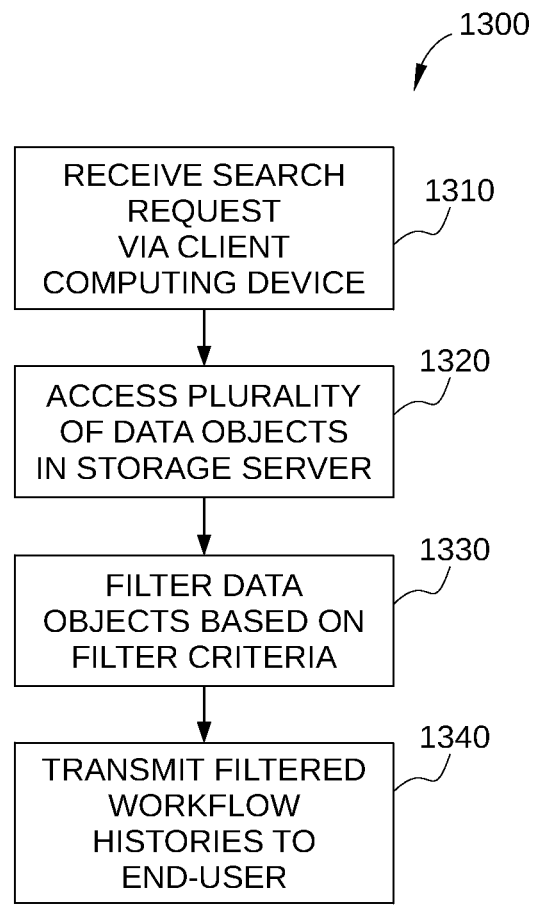
FIG. 13 is a flowchart of method steps for locating and sharing a workflow history of an electronic document, according to one embodiment of the present invention.

FIG. 13 is a flowchart of method steps for locating and sharing a workflow history of an electronic document, according to one example embodiment of the present invention. Although the method steps are described in conjunction with the systems of FIGS. 1-10, persons skilled in the art will understand that any system configured to perform the method steps, in any order, is within the scope of the present invention.

As shown, a method 1300 begins at step 1310, where storage server 400 receives a search request via a client computing device, such as client computing device 3002. The search request may include one or more filtering criteria related to one or more tools associated with a software application that is configured to modify electronic document 302, such as software application 104.

In step 1320, storage server 400 accesses a plurality of data object 410 stored in storage server 400. Each data object 410 includes a portion of metadata 360, i.e., information that is related to a tool, command, or other parameter associated with a software application or a workflow history of an electronic document.

In step 1330, storage server 400 filters the plurality of data objects 410 based on the one or more filter criteria received in step 1310 to produce a set of filtered workflow histories.

In step 1340, storage server 400 transmits the set of filtered workflow histories to client computing device 3002 for display to an end-user.

In sum, the present application describes techniques for capturing a workflow history and video of an electronic document, and for efficiently locating and viewing the captured workflow video. Events generated by an application while modifying an electronic document are stored on a web server as metadata. In addition, a captured digital image or frames of captured digital video that reflect the state of the document at the time the event was generated are also stored on the web server. The metadata is associated with one or more portions of the document and with the captured digital image or frames of captured digital video. Because the metadata and captured digital image or frames of captured digital video are associated with each other and are stored together on a web server, an advantage of the disclosed approach is that the captured digital images or frames of digital video are easily accessed by end-users.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for locating and sharing a workflow history of an electronic document, the method comprising:
   receiving a search request via a client computing device that includes one or more filtering criteria related to at least one of (1) a command or tool implemented in a first application to modify the electronic document, and (2) information about a user implementing the command or tool in the first application to modify the electronic document;
   accessing a plurality of data objects created by a second application and stored in a memory, wherein each data object includes information that is related to the electronic document, the first application, a creator of the electronic document, and a workflow history comprising one or more events generated by the first application, wherein the one or more events comprise at least one of (1) information about at least one command or tool implemented in the first application to modify the electronic document, and (2) information about a user implementing the at least one command or tool to modify the electronic document;
   filtering the plurality of data objects based on the one or more filtering criteria to produce a set of filtered workflow histories, wherein the one or more filtering criteria are based on the information included in the data objects and are applied to the information included in the data objects; and
   transmitting a first filtered workflow history from the set of filtered workflow histories to the client computing device for display to an end-user,
   wherein each of the first application and the second application comprises a client-based application.

2. The method of claim 1, further comprising enabling the client device to access a browser application.

3. The method of claim 2, further comprising causing a visual representation that is associated with the first filtered workflow history included in the set of filtered workflow histories to be displayed on the client device via the browser application.

4. The method of claim 3, wherein the visual representation comprises a video.

5. The method of claim 4, wherein causing a visual representation to be displayed on the client device comprises causing a navigation interface to be displayed, wherein the navigation interface includes multiple representations of frames selected from the video, each representation belonging to an expandable hierarchy of representations of frames that each represent a corresponding time segment of the video.

6. The method of claim 5, wherein causing a visual representation to be displayed on the client device comprises causing a graphical time indicator corresponding to each representation of one of the frames to be displayed.

7. The method of claim 3, wherein causing a graphical representation to be displayed on the client device comprises causing a timeline to be displayed that includes markers graphically representing one of an instant in time at which an event associated with the electronic document takes place and an interval of time during which an event associated with the electronic document takes place.

8. The method of claim 3, wherein causing a visual representation to be displayed on the client device comprises providing a text-based search interface configured to search the video based on data objects associated with the video.

9. The method of claim 3, wherein causing a visual representation to be displayed on the client device comprises causing mouse-related actions to be highlighted on corresponding regions of a graphical overlay that indicates mouse cursor position in the video.

10. The method of claim 3, wherein causing a visual representation to be displayed on the client device comprises causing a position of a graphical mouse overlay to be updated at a higher frame rate than a play back frame rate of the video.

11. The method of claim 1, wherein a first thread captures the digital image, and a second thread captures at least one of mouse cursor position information and mouse button-use information.

12. The method of claim 11, further comprising overlaying a mouse cursor movement onto the digital image based on at least one of the mouse cursor position information and the mouse button-use information.

13. The method of claim 1, wherein the one or more filtering criteria related to the first application comprises one or more of software product and product version, and wherein the information included in the data object comprises one or more of a software product identifier of the first application and a product version identifier of the first application.

14. The method of claim 1, wherein the information included in the data object includes metadata comprising a category of activity used to generate the electronic document, a software product identifier of the first application, product version information of the first application, tool information associated with the first application, command information associated with the first application, a creator of the electronic document, and a user skill level, and wherein each event is associated with at least one image or frame of captured video data that reflect a state of the electronic document at a time the event was generated.

15. A non-transitory computer-readable storage medium containing a program which, when executed, performs an operation for capturing a workflow history of an electronic document, the operation comprising:
receiving a search request via a client computing device that includes one or more filtering criteria related to at least one of (1) a command or tool implemented in a first application to modify the electronic document, and (2) information about a user implementing the command or tool in the first application to modify the electronic document;
accessing a plurality of data objects created by a second application and stored in a memory, wherein each data object includes information that is related to the electronic document, the first application, a creator of the electronic document, and a workflow history comprising one or more events generated by the first application, wherein the one or more events comprise at least one of (1) information about at least one command or tool implemented in the first application to modify the electronic document, and (2) information about a user implementing the at least one command or tool to modify the electronic document;
filtering the plurality of data objects based on the one or more filtering criteria to produce a set of filtered workflow histories, wherein the one or more filtering criteria are based on the information included in the data objects and are applied to the information included in the data objects; and
transmitting a first filtered workflow history from the set of filtered workflow histories to the client computing device for display to an end-user,
wherein each of the first application and the second application comprises a client-based application.

16. The non-transitory computer-readable storage medium of claim 15, the operation further comprising enabling the client device to access a browser application.

17. The non-transitory computer-readable storage medium of claim 16, the operation further comprising causing a visual representation that is associated with the first filtered workflow history included in the set of filtered workflow histories to be displayed on the client device via the browser application.

18. The non-transitory computer-readable storage medium of claim 17, wherein the visual representation comprises a video.

19. The non-transitory computer-readable storage medium of claim 18, wherein causing a visual representation to be displayed on the client device comprises causing a navigation interface to be displayed, wherein the navigation interface includes multiple representations of frames selected from the video, each representation belonging to an expandable hierarchy of representations of frames that each represent a corresponding time segment of the video.

20. The non-transitory computer-readable storage medium of claim 19, wherein causing a visual representation to be displayed on the client device comprises causing a graphical time indicator corresponding to each representation of one of the frames to be displayed.

21. The non-transitory computer-readable storage medium of claim 17, wherein causing a graphical representation to be displayed on the client device comprises causing a timeline to be displayed that includes markers graphically representing one of an instant in time at which an event associated with the electronic document takes place and an interval of time during which an event associated with the electronic document takes place.

22. The non-transitory computer-readable storage medium of claim 17, wherein causing a visual representation to be displayed on the client device comprises providing a text-based search interface configured to search the video based on data objects associated with the video.

23. The non-transitory computer-readable storage medium of claim 17, wherein causing a visual representation to be displayed on the client device comprises causing mouse-related actions to be highlighted on corresponding regions of a graphical overlay that indicates mouse cursor position in the video.

24. The non-transitory computer-readable storage medium of claim 17, wherein causing a visual representation to be displayed on the client device comprises causing a position of a graphical mouse overlay to be updated at a higher frame rate than a play back frame rate of the video.

25. A system for capturing a workflow history of an electronic document, the system comprising:
a memory; and
a processor coupled to the memory and configured to:
receive a search request via a client computing device that includes one or more filtering criteria related to at least one of (1) a command or tool implemented in a first application to modify the electronic document, and (2) information about a user implementing the command or tool in the first application to modify the electronic document;
access a plurality of data objects created by a second application and stored in a memory, wherein each data object includes information that is related to the electronic document, the first application, a creator of the electronic document, and a workflow history comprising one or more events generated by the first application, wherein the one or more events comprise at least one of (1) information about at least one command or tool implemented in the first application to modify the electronic document, and (2) information about a user implementing the at least one command or tool to modify the electronic document;
filter the plurality of data objects based on the one or more filtering criteria to produce a set of filtered workflow histories, wherein the one or more filtering criteria are based on the information included in the data objects and are applied to the information included in the data objects; and
transmit a first filtered workflow history from the set of filtered workflow histories to the client computing device for display to an end-user, wherein each of the first application and the second application comprises a client-based application.

* * * * *